E. S. BROWN.
HEN'S NEST.
APPLICATION FILED MAY 27, 1921.
1,401,459.
Patented Dec. 27, 1921.
2 SHEETS—SHEET 1.
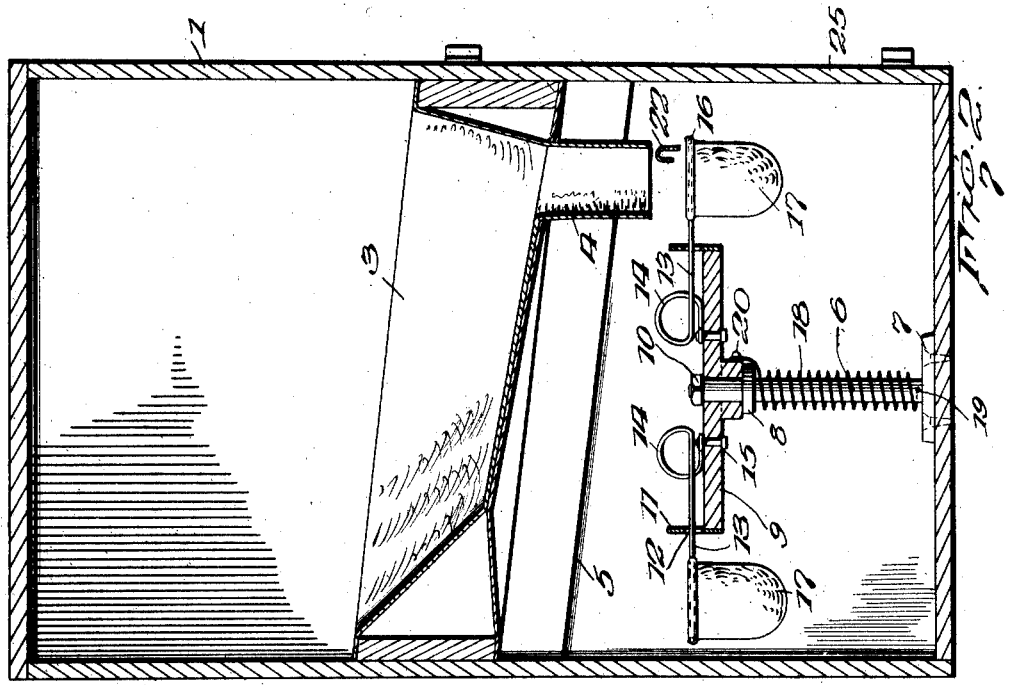
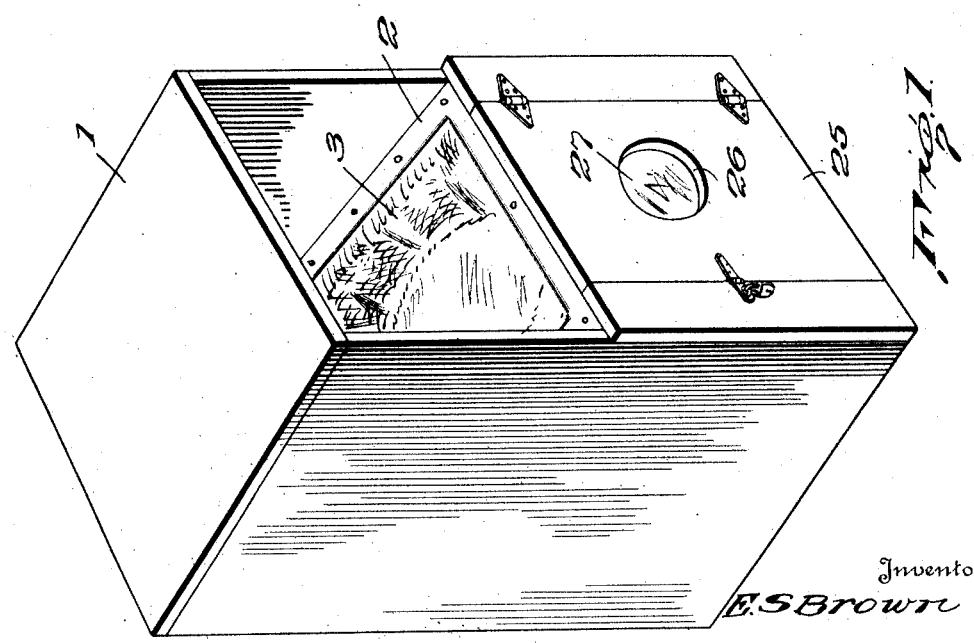
Inventor
E. S. Brown
By William C. Linton
Attorney E. S. BROWN.
HEN'S NEST.
APPLICATION FILED MAY 27, 1921.
1,401,459.
Patented Dec. 27, 1921.
2 SHEETS—SHEET 2.
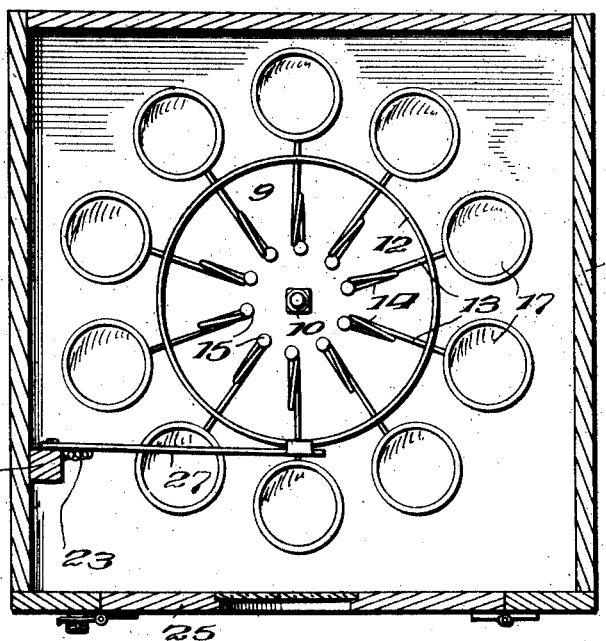
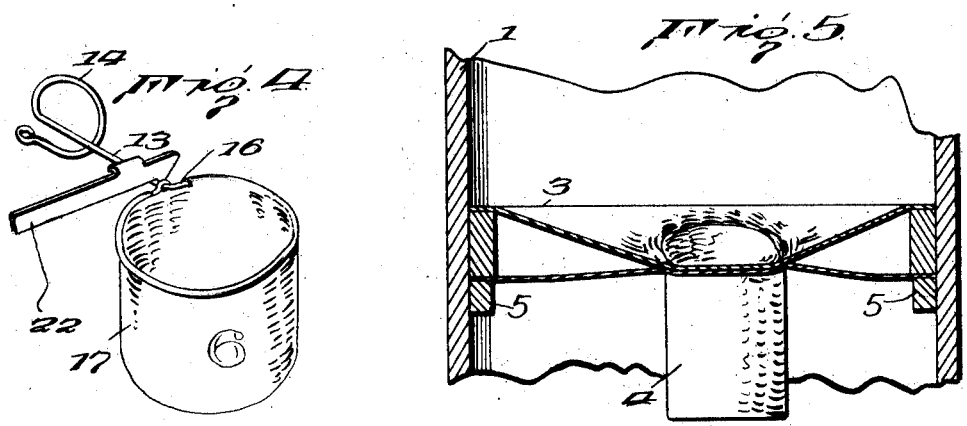
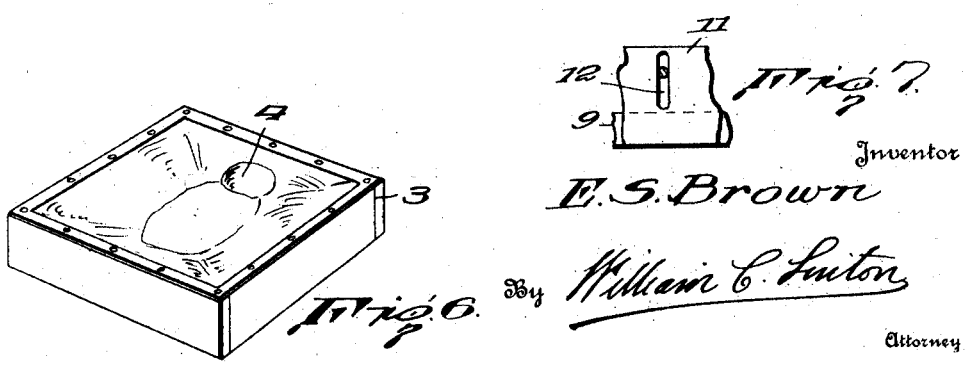
Inventor
E. S. Brown
By William C. Linton
Attorney

UNITED STATES PATENT OFFICE.

ENOCH S. BROWN, OF WARBA, MINNESOTA, ASSIGNOR OF ONE-HALF TO PAUL SCHARLAU, OF WARBA, MINNESOTA.

HEN'S NEST.

1,401,459.  Specification of Letters Patent.  Patented Dec. 27, 1921.

Application filed May 27, 1921. Serial No. 472,995.

*To all whom it may concern:*

Be it known that I, ENOCH S. BROWN, a citizen of the United States of America, residing at Warba, Minnesota, have invented certain new and useful Improvements in Hens' Nests; and I do hereby declare that the following is a full, clear, and exact description of the invention, such as will enable others skilled in the art to which it appertains to make and use the same.

This invention has reference to improvements in hen nests of the so-called trap type, having for an object to provide a nest of the character mentioned wherein the eggs as laid will be removed from the nest proper and directed into individual retaining devices therefor, whereat they will be protected from damage or theft, and as desired, may be removed with but little effort.

It is also an object of the invention to provide the individual egg retaining means with a novel form of mounting, this mounting being of such construction as will cause the full egg-retainers to be successively and automatically displayed by an empty retainer, such empty retainer being securely held in position to receive an egg from the nest, whereupon, it will be moved out of position and replaced by the following empty retainer.

A further object of the invention resides in the provision of means whereby the number of eggs contained by the nest may at all times be readily ascertained by an attendant.

Other objects will be in part obvious and in part pointed out hereinafter.

In order that the invention and its mode of operation may be readily understood by persons skilled in the art, I have in the accompanying illustrative drawings and in the detailed following description based thereon, set out one practicable embodiment of the same.

In these drawings:

Figure 1 is a perspective view of the improved nest;

Fig. 2 is a vertical section therethrough;

Fig. 3 is a horizontal section through the nest;

Fig. 4 is a detail in perspective showing the mounting of the individual egg retaining receptacles and the latch means for releasably maintaining said receptacles in position to receive an egg from the nest proper;

Fig. 5 is a detail in section showing the construction of the nest proper and the discharge way from which the eggs as laid are directed into the individual egg retainers;

Fig. 6 is a detail in perspective of the nest proper, and,

Fig. 7 is a fragmentary detail in elevation of the supporting frame for the individual egg retainers.

Having more particular reference to the drawings, in connection with which like characters of reference will designate corresponding parts throughout, my improved nest comprises a substantially rectangular housing indicated in its entirety by the numeral 1, said housing being divided into lower and upper compartments, the upper compartment receiving a substantially square frame 2 supporting thereon a fabric nest 3 provided with a discharge chute 4 communicating with its bottom whereby the eggs as laid will be directed into the individual egg retaining means, hereinafter more fully described. In this particular connection, it is to be noted that the nest proper indicated by the numeral 3 is supported in an inclined plane upon correpondingly arranged shoulders 5 secured to the inner sides of the nest walls.

The forward portion of the upper compartment of the housing 1 is open in order that ready access may be had to the nest 3 by the fowl.

Centrally mounted in the bottom or lower compartment of the nest housing 1 is a cylindrical bearing pillar 6, preferably, having a flange bottom 7, whereby the same may be secured to the bottom of said housing through the medium of screws, or other suitable fastening devices. An annular shoulder 8 is formed on the upper portion of this pillar 6 and rotatably receives thereon the hub portion of the circular individual egg retainer supporting frame designated by the numeral 9. In order to prevent vertical displacement of this frame 9 but yet permit of free rotation of the same about the bearing pillar 6, a nut may be and preferably is turned into engagement with the screw threaded upper end of the latter as clearly shown in the Fig. 2.

The circular frame 9 is provided with an upstanding flange 11 having a plurality of vertically disposed slots 12 formed therein.

A plurality of spring supporting arms 13 are arranged in radially disposed fashion upon the upper side of the circular supporting frame 9 and as will be noted, are looped intermediate their ends as at 14, the inner portions of said arms being formed with eyes whereby to receive fastening bolts 15 in order that the same may be securely affixed to said frame 9, while the outer ends thereof are received through the particular vertical slots 12 alined therewith. In this connection, it is to be also noted that the free portions of the spring arms 13 are arranged in a plane slightly above the inner or fixed portions thereof and its upstanding marginal flange 11. Horizontal loops 16 are formed on the free end portions of the spring arms 13 and serve to support the fabric individual egg retaining pocket or devices 17 in a substantially horizontal plane with respect to the discharge end of the chute 4. In this connection, it may be noted that due to the mounting of the pockets 17 on the free ends of the arms 13, the same will be provided with a yieldable or resilient support and by consequence, will be allowed to give slightly upon the dropping of an egg thereinto, in order that the breaking of the egg will be prevented.

As means for imparting rotary motion to the circular frame 9, a coiled compression spring 18 is arranged about the vertical bearing pillar 6, having one end thereof secured as at 19 to the pillar while the remaining end thereof is secured as at 20 to the hub portion of said circular frame 9. In order that the circular frame 9 will be held in a position whereat one of the egg retaining devices or pockets 17 will be alined with the discharge chute 4, I pivotally mount upon a bar 21 arranged in the lower compartment of the housing 1 a latch 22, preferably forming the same of some suitable spring material and engaging the inner portion thereof with one end of a coiled spring 23, having its opposite or remaining end fixedly secured to an adjacent portion of the corresponding housing wall. In this way, it will be appreciated that the hooked end of the latch 22 will be normally maintained in its lowermost position and that in consequence said latch will be normally maintained in position for engagement with one of the egg retaining pockets 17 in order that the pocket so engaged will be releasably held in vertical alinement with the discharge chute 4 extending from the bottom of the nest proper 3. Lateral displacement of the free end of the latch 22 is prevented by means of a finger formed on the inner side thereof and slidably engaging over the marginal portion of the flange 11.

The lower compartment of the nest housing 1 is preferably closed by a horizontally swinging door 25 having a window 26 arranged therein whereby the egg retaining pockets 17 may be readily seen by an attendant. Also, if desired, the various egg retaining pockets 17 may be numbered as indicated at 27 as in this way an attendant may at all times correctly ascertain the number of eggs in the nest, assuming, of course, that the nest numbered "1" is alined with the discharge chute 4 of the nest 3.

The operation of my improved nest may be reviewed as follows:

As an egg is laid in the nest 3 it will immediately roll over the inclined bottom of the same and will be carried from the nest by way of the discharge chute 4 into the particular egg retaining pocket 17 alined therewith; for example, the egg retaining pocket 17 bearing the numeral "1." As the egg is deposited in the egg retaining pocket 17, the weight of the same will cause the free portion of its particular supporting arm 13 to be flexed downwardly and with such downward movement of the arm, the same will be disengaged from the latch 22. In consequence, the circular frame 9 will be promptly rotated under influence of the compression spring 18 until the following or next egg retaining pocket 17 is brought into alinement with the discharge chute 4. When in this position, the following empty egg retaining pocket will be stopped by reason of its engagement with the latch 22 and as previously stated, will be held in this position until a second egg is deposited therein, whereupon it too will be disengaged from the latch and the following empty pocket brought into alinement with the egg discharge chute 4. This operation will be repeated until the entire number of egg retaining pockets 17 have had eggs deposited therein, which latter condition is readily ascertainable by an attendant, merely upon reading the particular number of the egg retaining pocket alined with the window 26 in the door 25. At this time, the nests may be emptied and the compression spring 18 rewound for a second operation, the pocket numbered "1," of course, being first alined with the discharge chute 4.

Due to the arrangement of the nest 3 in the upper compartment of the housing 1, it is to be understood that ready access may be had thereto by fowl while the lower compartment of said housing containing the egg retaining pockets will be closed by the door 25 and thus protected.

Manifestly, the construction shown is capable of considerable modification as is within the scope of my claims I consider within the spirit of my invention.

I claim:

1. A hen's nest comprising a housing divided into upper and lower compartments, a nest proper in said upper compartment having an egg discharge chute communicating with its bottom, a horizontal rotatable frame mounted in the lower compartment, a plurality of spring arms secured in radial fashion to said frame and having portions thereof extended beyond the same, egg receiving and retaining pockets carried on said free end of the spring arms adapted to be successively alined with the discharge chute, and latch means engageable with said egg retaining pockets as the same are brought into successive alinement with the discharge chute for retaining the former in alinement with the latter, but automatically disengaging said pocket upon the deposit of an egg therein.

2. A hen's nest comprising a housing divided into upper and lower compartments, a nest proper in said upper compartment having a discharge chute communicating with its bottom, a horizontal rotatable frame mounted in said lower compartment, means for imparting rotary motion, at times, to said frame of radially disposed arms affixed at their inner ends to the frame and having their outer ends extended for distances beyond the marginal portion of the frame and arranged in planes slightly above the fixed inner ends thereof, egg retaining pockets carried on said free ends of the spring arms adapted to be successively alined with said discharge chute, and latch means engageable with said pockets as the same are successively alined with the discharge chute for maintaining the particularly alined pocket in a position to receive an egg from the nest proper, the arm carrying said pocket being adapted to be flexed downwardly upon the deposit of an egg therein, whereby to disengage said arm from the latching means and permit the rotation of the horizontal frame whereby the following empty pockets will be brought into alinement with said discharge chute.

3. A hen's nest comprising a housing, divided into upper and lower compartments, the upper compartment being open, a nest proper arranged in said upper compartment having an inclined bottom, a discharge chute communicating with said bottom and extending downwardly into the lower compartment, a vertically disposed bearing pillar mounted in the lower compartment, a circular horizontal frame rotatably mounted on said bearing pillar, a coiled spring arranged about the bearing pillar and connected with the same and with said frame whereby to impart rotary movement to the latter, an upstanding flange on the marginal portion of the circular frame having a plurality of vertically disposed slots formed therein, a plurality of radially disposed spring supporting arms secured at their inner ends to the supporting frame, said arms being looped intermediate their ends and having their free portions extended through the vertical slots in said upstanding flange, such free portions being arranged in planes above the inner ends of the arms, egg retaining pockets carried on the free ends of the supporting arms adapted to be successively alined with said discharge chute, a laterally movable latch secured to a portion of the housing and extending to a position whereat the same will engage that egg retaining pocket alined with the discharge chute and retain the same in such position, said free portion of the spring arm carrying the alined egg retaining pocket being adapted to be flexed downwardly upon the depositing of an egg therein whereby to disengage the arm from said latch and permit of limited rotary movement of the circular frame for the alining of the following empty egg retaining pocket with said chute and engagement with the latch, each of said egg retaining pockets having indicating numerals arranged on their outer sides, and a door for closing said lower compartment provided with a window through which the numerals on the egg retaining pockets may be viewed.

In witness whereof I have hereunto set my hand.

ENOCH S. BROWN.